US012554070B2

(12) United States Patent
Hostetler et al.

(10) Patent No.: US 12,554,070 B2
(45) Date of Patent: Feb. 17, 2026

(54) SPECTRAL BEAM COMBINING OPTICAL ASSEMBLY AND METHOD OF FABRICATION

(71) Applicant: Coherent Aerospace & Defense, Inc., Murrieta, CA (US)

(72) Inventors: John Louis Hostetler, Hightstown, NJ (US); Martin Seifert, New Hartford, CT (US); Jared Howard Gaertner, Narberth, PA (US)

(73) Assignee: Coherent Aerospace & Defense, Inc., Murrieta, CA (US)

( * ) Notice: Subject to any disclaimer, the term of this patent is extended or adjusted under 35 U.S.C. 154(b) by 203 days.

(21) Appl. No.: 18/178,410

(22) Filed: Mar. 3, 2023

(65) Prior Publication Data
US 2023/0305234 A1      Sep. 28, 2023

Related U.S. Application Data

(60) Provisional application No. 63/269,872, filed on Mar. 24, 2022.

(51) Int. Cl.
*G02B 6/293* (2006.01)

(52) U.S. Cl.
CPC ...... *G02B 6/29311* (2013.01); *G02B 6/29395* (2013.01)

(58) Field of Classification Search
CPC .............. G02B 6/29311; G02B 6/29395
See application file for complete search history.

(56) References Cited

U.S. PATENT DOCUMENTS

| 7,970,040 | B1 * | 6/2011 | Sprangle ................. H01S 3/067 372/98 |
| 10,495,820 | B1 | 12/2019 | Whaley |
| 11,624,931 | B2 * | 4/2023 | Nguyen ............. G02B 27/1013 359/639 |
| 11,757,248 | B2 * | 9/2023 | Di Teodoro .......... H01S 3/1003 372/68 |

(Continued)

FOREIGN PATENT DOCUMENTS

| CN | 106129789 A | 11/2016 |
| CN | 106338836 A | 1/2017 |

(Continued)

OTHER PUBLICATIONS

CN-113488845-A, English Language Text, 2021 (Year: 2021).*

(Continued)

*Primary Examiner* — Peter Radkowski
(74) *Attorney, Agent, or Firm* — McDonnell Boehnen Hulbert & Berghoff LLP

(57) ABSTRACT

An apparatus is used for spectral beam combining laser wavelengths into a combined beam. The apparatus has an integrated, sealed optical assembly that can be installed and replaced in the field. The optical assembly has a housing composed of a material, such as fused silica, transparent to the laser wavelengths. Transmissive gratings are disposed on ends of the housing and have their datums facing the sealed interior. V-grooves on a shelf at one end of the housing are disposed at an angle relative to the first grating. Fiber ends of a fiber array have end caps affixed in the V-grooves and aligned to the datums of the first grating. The fiber ends transmit the laser wavelengths in an array of beams toward the first grating, which diffracts the laser wavelengths to the second grating. In turn, the second grating transmits the laser wavelengths as a combined beam from the second end of the housing.

22 Claims, 7 Drawing Sheets

(56) References Cited

U.S. PATENT DOCUMENTS

| | | | |
|---|---|---|---|
| 2014/0368916 A1 | 12/2014 | Shiozaki et al. | |
| 2020/0174265 A1* | 6/2020 | Nguyen | G02B 27/1013 |
| 2021/0021095 A1* | 1/2021 | Di Teodoro | H01S 3/0085 |
| 2021/0103152 A1* | 4/2021 | Goodno | H01S 3/2391 |
| 2021/0103153 A1* | 4/2021 | Goodno | H01S 3/1307 |
| 2021/0103155 A1* | 4/2021 | Goodno | G02B 27/0944 |
| 2022/0021460 A1* | 1/2022 | Di Teodoro | G02B 5/1814 |
| 2022/0063031 A1* | 3/2022 | Ho | H01S 5/0237 |
| 2022/0066094 A1* | 3/2022 | Ho | G02B 6/3672 |

FOREIGN PATENT DOCUMENTS

| | | | | |
|---|---|---|---|---|
| CN | 113488845 A | * | 10/2021 | H01S 5/18361 |
| KR | 20210018925 A | | 2/2021 | |

OTHER PUBLICATIONS

Zheng et al., High-power, high-beam-quality spectral beam combination of six narrow-linewidth fiber amplifiers with two transmission diffraction gratings, Applied Optics, vol. 58, No. 30 / Oct. 20, 2019, 8339 (Year: 2019).*

Schreiner Protech, Pressure compensation seals from Schreiner ProTech ensure venting of radar lane change assist, Newsletter, 2019; available at https://www.labelsandlabeling.com/news/new-products/pressure-compensation-seals-schreiner-protech-ensure-venting-radar-lane-change-assist (Year: 2021).*

Zheng, Ye , et al., "High-Power, High-beam-quality Spectral Beam Combination of Six Narrow-linewidth Fiber Amplifiers with Two Transmission Diffraction Gratings", Engineering and Laboratory, Oct. 20, 2019, 58:30:8339-8343.

* cited by examiner

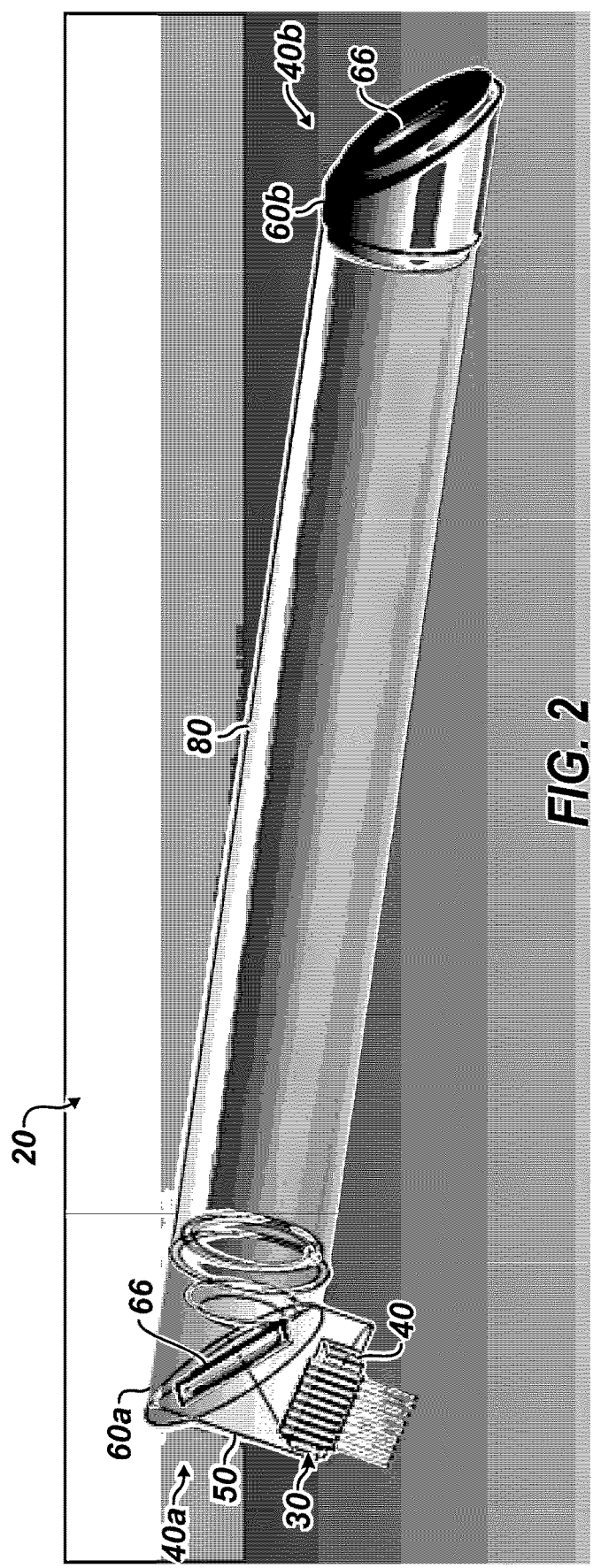

SPECTRAL BEAM COMBINING OPTICAL ASSEMBLY AND METHOD OF FABRICATION

CROSS-REFERENCE TO RELATED APPLICATIONS

The present application claims priority to U.S. Patent Application No. 63/269,872 filed Mar. 24, 2022. The aforementioned application is hereby incorporated by reference in its entirety.

BACKGROUND OF THE DISCLOSURE

High Energy Laser (HEL) Spectral Beam Combining (SBC) systems require a grating that must have high laser resistance. In other words, the grating must be impervious to high irradiances of laser light. Therefore, the grating needs to be kept free of contamination during fabrication, packaging, shipping, and operation. Not only should the intrinsic materials of the grating be resistant to high laser irradiances, but the atmosphere around the grating must be controlled to minimize contaminants like water vapor, dust, and airborne particles. When irradiated with high laser power, for example, the grating's surfaces can act as a getter, drawing in airborne particles, and therefore, high control over the atmosphere must be maintained during use.

Some existing SBC systems utilize a single grating. However, the effect of wavelength dispersion degrades the beam quality of the combined beams. When one grating is used, for example, wider source laser spectral widths add asymmetric divergence, which limits the usefulness of a beam at longer propagation distances or requires complex beam optics to mitigate. To counter this effect, very spectrally narrow laser sources can be used so that the dispersion is reduced. This approach requires expensive laser sources and also limits the power per channel that can be deployed. For example, when using fiber amplifiers, broader spectral widths are preferably used to suppress stimulated Brillouin scattering and other nonlinear effects, which are major power limiting phenomena.

Some existing SBC systems utilize two "matched" gratings for a dispersion-compensated system to mitigate wavelength dispersion. Such an arrangement allows for higher beam quality using wider spectral widths, which can improve beam quality and can require less expensive, higher power laser sources. However, the two gratings must be aligned with high accuracy, and they must be impervious to misalignment from ambient and operational effects, such as thermal distortion and mechanical stresses.

Existing SBC optical systems must be built and serviced in a cleanroom environment by capable engineers with special tools. Current solutions to maintain the cleanliness of HEL SBC gratings when in operation involve controlling airborne particles within the system, e.g. with the use of HEPA filters, and moisture control through dry air purging. This approach does not address the sensitive HEL gratings during shipment and replacement. This approach also makes opening the system outside of a cleanroom prohibitive, as well as adds complexity to the system. Typically, whole systems are sent back for replacement of critical HEL optics in a certified cleanroom.

The subject matter of the present disclosure is directed to overcoming, or at least reducing the effects of, one or more of the problems set forth above.

BRIEF DESCRIPTION OF THE DRAWINGS

FIG. 2 illustrates a perspective view of the disclosed optical assembly.

DETAILED DESCRIPTION OF THE DISCLOSURE

Figure 1:
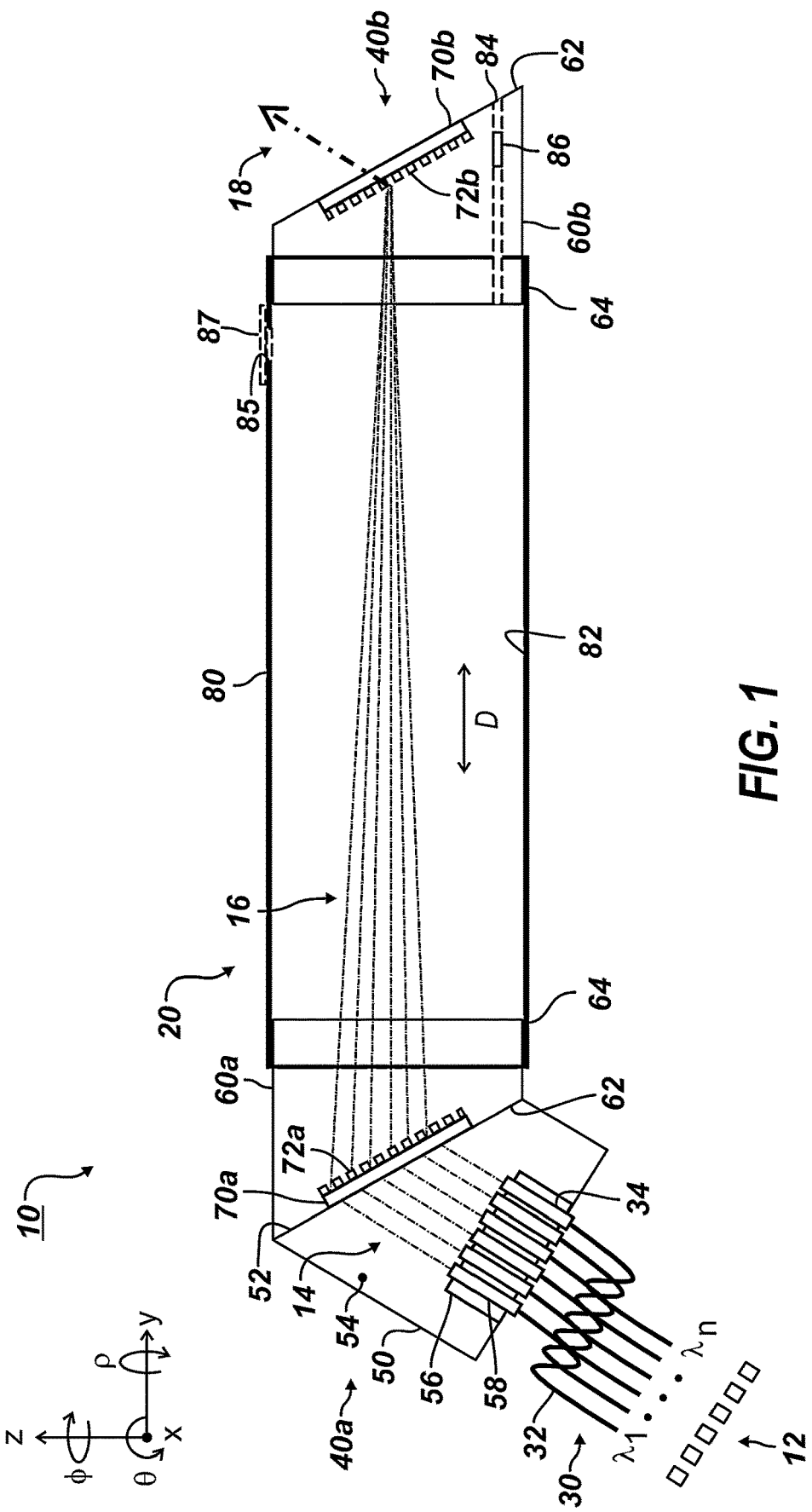
FIG. 1 schematically illustrates an optical assembly used for a High Energy Laser (HEL) Spectral Beam Combining (SBC) system.

FIG. 1 schematically illustrates an optical assembly 20 used in a High Energy Laser (HEL) Spectral Beam Combining (SBC) system 10. The optical assembly 20 is used in a dual-grating fiber SBC system 10. The optical assembly 20 includes a fiber assembly 30, a first end plug 40a, an optical housing 80, and a second end plug 40b. The first end plug 40a includes a fiber launch 50, a first grating mount 60a, and a first diffraction grating 70a, while the second end plug 40b includes a second grating mount 60b and a second diffraction grating 70b. Both the first and second diffraction gratings 70a-b are transmissive. The first and second diffraction gratings 70a-b deflect incident beams according to their wavelengths so that all of the incident beams will subsequently propagate in the same direction.

In general, the dual-grating fiber SBC system 10 includes a linear array of independently collimated, or near collimated, fiber laser sources 12. Each of these laser sources 12 can use any suitable source, such as a master oscillator power amplifier (MOPA) having a seed laser and an optical amplifier or a traditional fiber laser having an oscillator within a primary gain fiber. The laser sources 12 have their parallel input beams 14 directed to the first transmissive diffraction grating 70a. A plurality of input beams 14 from the fiber laser sources 12 are set at closely spaced wavelengths $\lambda_1 < \lambda_2 \ldots < \lambda_n$ in the array 30. The gratings 70a-b of the system 10 are wavelength-sensitive and combine (superimpose) these input beams 14 together into a high-power combined colinear beam 18. The power of the combined beam 18 is the sum of the powers of the input beams 14.

In particular, the first grating 70a maps the respective incident input beams 14 to an array of diffracted beams 16 at wavelength-dependent diffraction angles. These diffracted beams 16 are directed to the second transmissive diffraction grating 70b, which is located at a distance D from the first grating 70a. At the second grating 70b, the diffracted beams 16 are spatially overlapped and are diffracted by the second grating 70b into a single combined colinear beam 18 at a common exit angle. This combined beam 18 can then be used for various purposes. For example, the combined beam 18 may be expanded and directed to a target using conventional techniques.

Figure 3A:
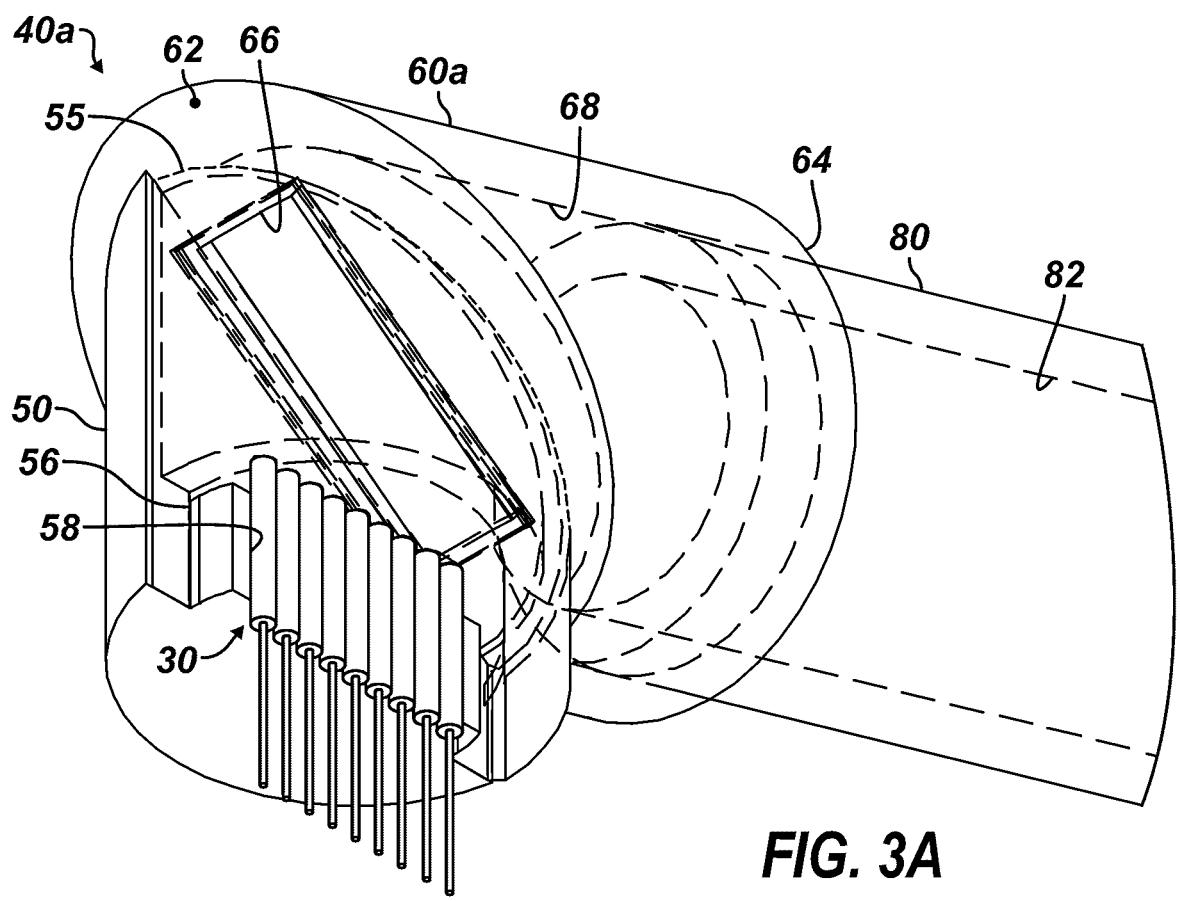
FIG. 3A illustrates an isolated perspective view of one end of the disclosed optical assembly.
Figure 3B:
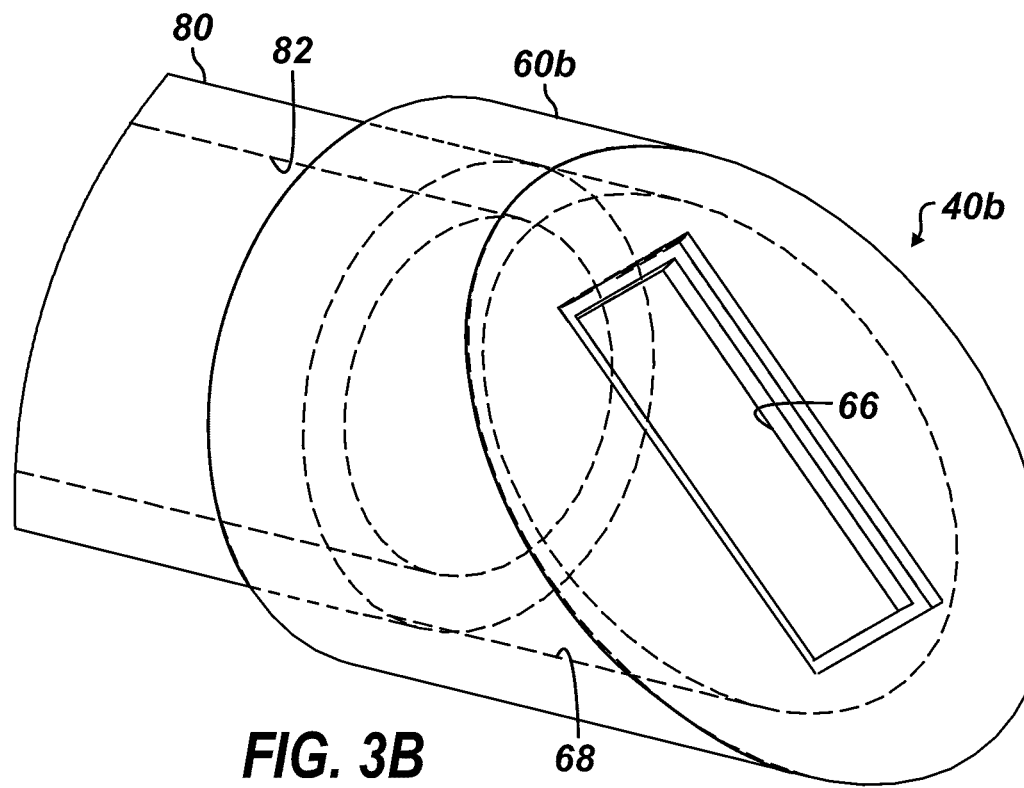
FIG. 3B illustrates an isolated perspective view of another end of the disclosed optical assembly.

For further reference, FIG. 2 illustrates a perspective view of the disclosed optical assembly 20. FIG. 3A illustrates an isolated perspective view of the first plug end 40a of the disclosed optical assembly 20, while FIG. 3B illustrates an isolated perspective view of the second plug end 40b of the disclosed optical assembly 20.

The optical assembly 20 is used for spectral beam combining wavelengths of laser light from fibers of laser sources 12 into a combined beam. The first mount 60a has an angled end or face 62 and another end 64, which can preferably be cylindrical to allow for rotational alignment. The second mount 60b has an angled end or face 62 and another end 64 which can preferably be cylindrical to allow for rotational alignment.

The housing 80 is preferably a tube so rotational alignment can be performed, but other shapes could be used. The tube 80 has a first open end affixed to the cylindrical end 64 of the first mount 60a, and the tube 80 has a second open end affixed to the cylindrical end 64 of the second mount 60b.

The first transmissive grating 70a is affixed to the angled end 62 of the first mount 60a and has first datums 72a. The second transmissive grating 70b is affixed to the angled end 62 of the second mount 60b and has second datums 72b. The second datums 72b are aligned to the first datums 72a, and the two transmissive gratings 70a-b are arranged parallel to one another. The transmissive gratings 70a-b can be made of fused silica with proper grating properties, datums 72a-b, and the like for the application at hand. Any suitable form of the grating can be used for the application at hand. To improve the spectral beam combining, the gratings 70a-b preferably exhibit a laser-induced damage threshold (LIDT) that is as high as possible.

The tube 80 provides an enclosure to protect the grating surfaces and datums 72a-b of the gratings 70a-b in the interior 82 from airborne particles. The tube 80 is preferably micro-vented to allow pressure to be equalized, but protects the interior 82 from airborne particles and water vapor. For example, the tube 80 can include one or more pressure-equalizing vents or orifices having filter structures, such as permeable membranes, microporous films, expanded polytetrafluoroethylene (ePTFE) membranes, or the like. The permeable filter structure in the vent is intended to allow for pressure equalization, but to prevent contaminants and moisture from entering the sealed interior 82 of the tube 80. For example, the pressure-equalizing vents 84 with the permeable filter structure 86 can be defined in one or both of the mounts 60a-b to communicate pressure with the interior 82 of the tube 80, but to prevent containments and moisture from entering the interior 82.

In addition or in the alternative, one or more orifices 85 and one or more nonpermeable membranes 87 can be used to allow for expansion during rapid pressure changes. For example, in a non-vented structure, one or more shaped cutouts or orifices 85 can be defined in the assembly 20, such as near the distal end of the support tube 80 where the beam path is narrowest. One or more flexible membranes 87 can be disposed in association with the one or more orifices 85 to form an environmental seal. For example, a flexible membrane 87 can be disposed over the outside of the tube 80 and can cover the orifice(s) 85. The nonpermeable membrane 87 can flex relative to the orifice 85 to change the sealed volume of the interior 82, which can accommodate pressure differentials without the need for venting (or at least supplementing the venting). Even with micro-porous venting being used on the optical assembly 20, for example, such a pressure accommodation is valuable because the optical assembly 20 is likely to see rapid pressure/depressurization cycles.

The fiber launch 50 is affixed to the first mount 60a adjacent the first transmissive grating 70a and has a shelf or side 54 with a plurality of V-grooves 58, which are disposed at an angle to the first transmissive grating 70a. For example, an angled end 52 of the fiber launch 50 is affixed to the angled end 62 of the first mount 60a, and a V-groove block 56 having the V-grooves 58 is affixed to the shelf 54 of the fiber launch 50.

End caps 34 of the fiber assembly 30 are affixed in the V-grooves 58 and are aligned to the first datums 72a of the first transmissive grating 70a. The end caps 34 are attached to fibers 32 of the fiber assembly 30. The fibers 32 are configured to splice to fibers of the laser sources 12. Each fiber 32 is fibered to a laser source 12 that has a different wavelength. The end caps 34 used for the high-power fibers 32 can reduce the power density at the output end of the fiber facet to prevent damage. A clad-light stripper can be used to reduce the back-reflection of the laser light. Collimation optics can be used to collimate the laser light from the end caps 34. For example, the end caps 34 can include a collimation lens. The end caps 34 can also be configured to be near collimated.

The end caps 34 are configured to collimate the laser light 14 of the laser sources 12 in a line of collimated beams 14 toward the first transmissive grating 70a. The first datums 72a of the first transmissive grating 70a are configured to transmit the laser light in a line of diffracted, converging beams 16 through the tube 80 to the second transmissive grating 70b. The second datums 72b of the second transmissive grating 70b are configured to transmit the laser light as a combined beam 18, which all the beams overlapped collinearly.

The first mount 60a includes a window 66 for placement of the first grating 70a. A passage 68 communicates the window 66 with the cylindrical end 64. A substrate of the grating 70a is affixed in this window. The affixation can provide a seal. The grating surface with the datums 72a is positioned in this passage 68 so that the diffracted beams (16) from the grating 70a can exit from the cylindrical end 64 of the first mount 60a and into the interior 82 of the tube 80.

The second mount 60b is similarly arranged. The second mount 60b also includes a window 66 for placement of the second grating 70b. A passage 68 communicates the window 66 with the cylindrical end 64. A substrate of the grating 70b is affixed in this window 66. The affixation can provide a seal of the window 66. The grating surface with the datums 72b are positioned in this passage 68 so that diffracted beams (16) from the grating 70b can enter from the cylindrical end 64 of the first mount 60a and impinge on the grating's datums 72b.

The fiber launch 50 can include a recess for installing and affixing a V-groove block 56. If practical and if proper alignment can still be achieved, the shelf 54 can have the V-grooves 58 integrated therein. However, the modular form of assembly using the fiber launch 50 and the separate V-groove block 56 facilitates the required alignment steps when the components are assembled and affixed together.

Figure 4A:
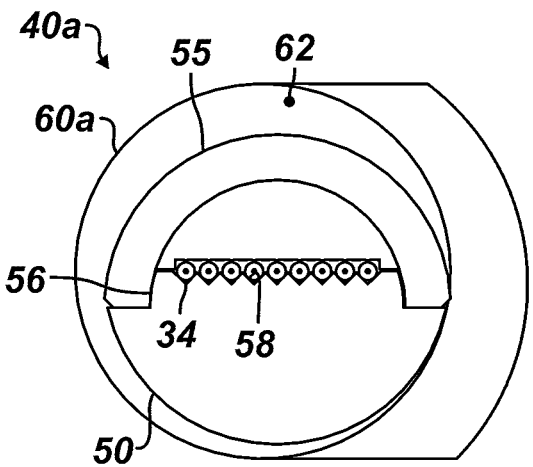
FIGS. 4A-4B illustrates isolated end views of an end of the disclosed optical assembly having a shell.
Figure 4B:
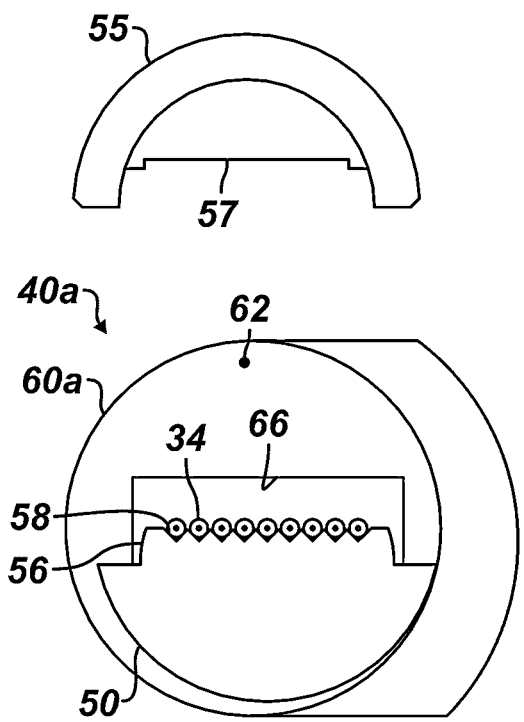

The collimated beams 14 from the end caps 34 can be enclosed by a shell or other enclosure on the first end plug 40a of the disclosed assembly 20. This can prevent contaminants from being drawn into the beams 14 and collecting on the backside of the first transmissive grating 70a. For example, FIGS. 4A-4B illustrates isolated end views of the first plug end 40a of the disclosed optical assembly 20 having a shell 55. As shown, the shell 55 can be affixed to the fiber launch 50 to enclose the free-space of the collimated beams (14) from the end caps 34 as they pass to the first grating 70a. The opening 57 of the shell 55 can accommodate the end caps 34 and can be sealed with an epoxy or other sealant. The sealed enclosure from the shell 55 and sealant can prevent contamination from being drawn by the collimated beams (14) and from collecting on the backside of the first grating 70a.

Figure 5A:
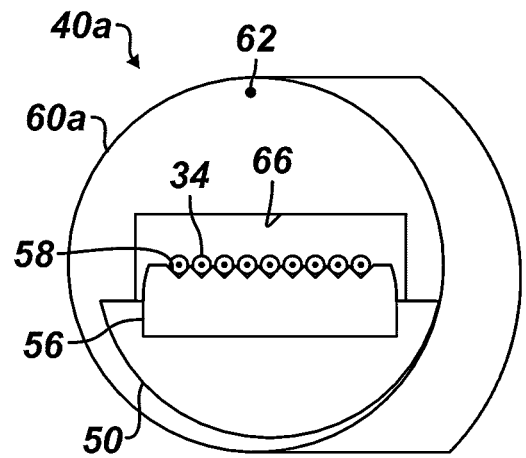
FIGS. 5A-5B illustrates an isolated end view of an end of the disclosed optical assembly having a modular V-block.
Figure 5B:
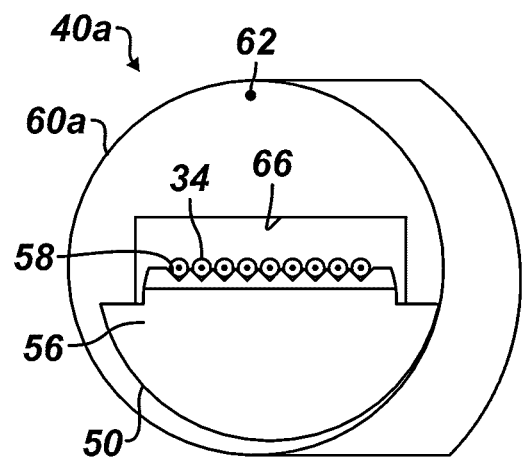

As noted previously and as illustrated in FIGS. 4A-4B, the mount 60a, fiber launch 50, and block 56 for the end plug 40a can be fabricated as an integrated end plug component. Other arrangements are possible. For example, FIGS. 5A-5B illustrate isolated end views of the first plug end 40a of the disclosed optical assembly 20 having a modular V-block 56. The mount 60a and fiber launch 50 can be fabricated as an integrated end plug component with the V-groove block 56 separately affixed. Alternatively, the fiber launch 50 and block 56 can be fabricated as an integrated component that affixes to the separate mount 60a. The V-groove block 56 can be indexed to surfaces of the shelf 54 to provide alignment within proper tolerances.

Still, as shown, each of these elements 60a, 50, 56 can be separate components for modular assembly as the end plug 40a for the tube (80). In fact, the two mounts 60a-b can be identical to one another. These and other variations are possible.

Figure 6:
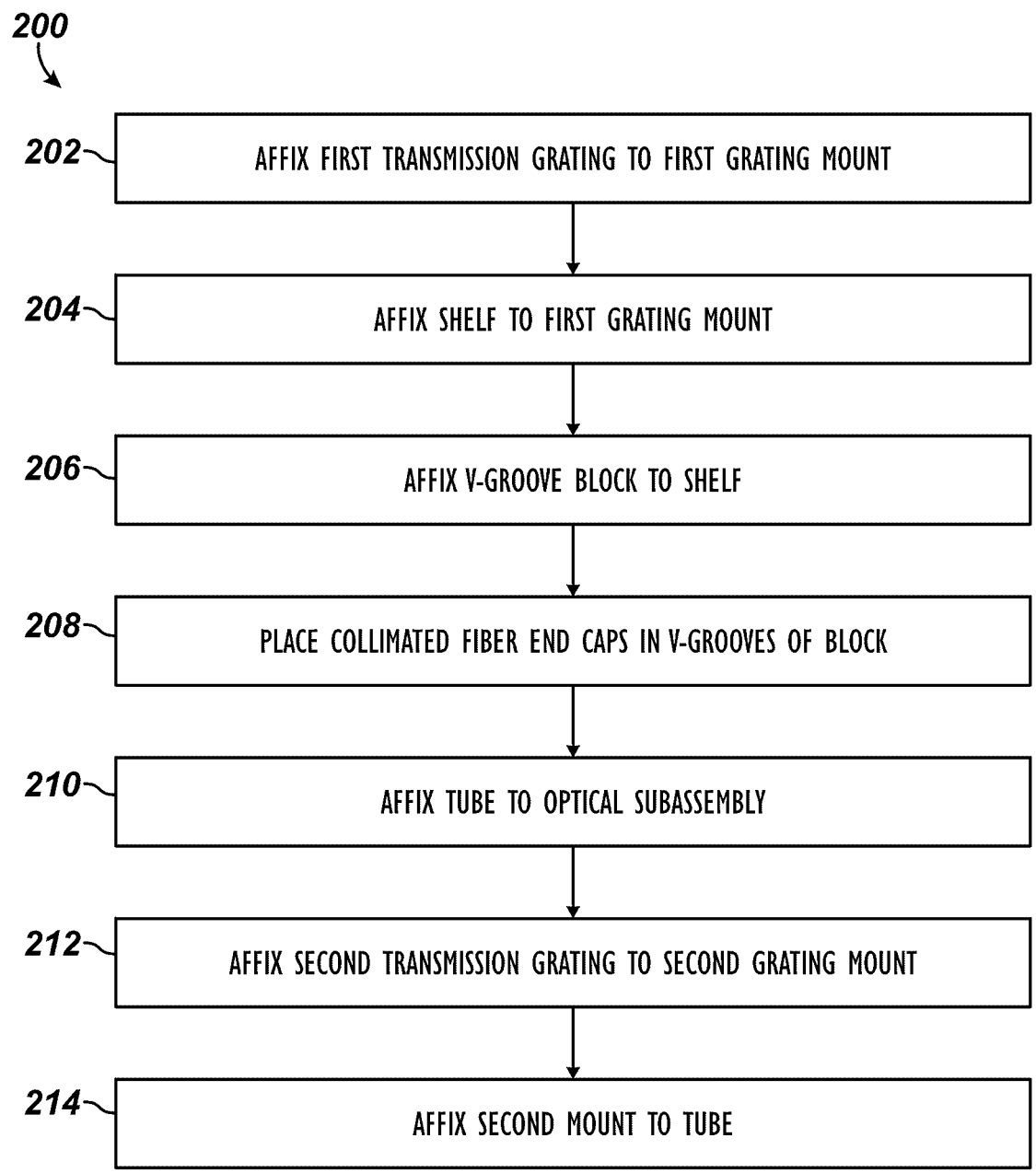
FIG. 6 illustrates a process of manufacturing the disclosed optical assembly in flowchart form.

FIG. 6 illustrates a process 200 of manufacturing the disclosed optical assembly 20 in flowchart form. As noted, each of the components of the assembly 20 is composed of fused silica or other comparable material. In the first assembly step, the first transmissive grating 70a is affixed to the first mount 60a for the first end plug 40a (Block 202). The grating 70a can be indexed to the window 66 of the mount 60a to provide passive alignment of the datums within proper tolerances. The grating 70a is secured by curing a UV-cured adhesive.

In the process 200 described here, the fiber launch 50 and V-groove block 60 are separate components of the first end plug 40a, but other arrangements can be used as already noted. To complete the assembly of the first end plug 40a, the fiber launch 50 is affixed to the first mount 60a by using a UV-cured adhesive between the angled end 52 of the launch 50 and the angled face 62 of the mount 60a (Block 204). The launch can be passively aligned with the datums of the first grating 70a. The alignment is secured by curing the UV-cured adhesive.

The V-groove block 56 is then affixed to the fiber launch 50 (Block 206). The angle at which the V-groove block 56 can be actively aligned to a proper angle relative to the first grating. The alignment is then secured by curing the UV-cured adhesive. The purpose is to fix the V-groove block 56 to the first mount 60a so the V-grooves 58 and end caps 34 maintain alignment with the grating 70a with minimal distortion during temperature variation.

The collimated fibered end caps 34 are then aligned and affixed in the V-grooves 56 of the V-groove block 56 (Block 208). The V-grooves 58 of the block 56 lie side-by-side in a y-z plane, and the end caps 34 are each placed in one of the V-grooves 58 fabricated in the V-groove block 56 and affixed after active alignment using a UV-cured adhesive. To do this, each end cap 34 is placed one by one, rotated, and wavelength (λ) tuned until the beam produced is aligned to a desired target after passing through the transmissive grating 70a. The active alignment of each end cap 34 is secured one by one by curing the UV-cured adhesive used to affix each end cap in place on a V-groove 58 of the block 56. In this way, the end caps 34 are aligned to the datums 72a of the first transmissive grating 70a so that the collimated beams (14) are parallel to one another, lie in a plane perpendicular to the direction of the datums 72a, and are incident to the datums 72a of the grating 70a at a proper angle.

The resulting first end plug 40a having the mount 60a, the shelf 50, the V-groove block 56, and the end caps 34 is then attached to the tube 80 for the optical assembly 20 (Block 210). The grating side having the datums 72a is positioned to face inside the interior 82 of the tube 80. The cylindrical end 64 can fit inside (or onto) the open end of the tube 80. Either way, the mount 60a can be passively aligned with the tube 80 so diffracted beams (16) would converge toward the central axis of the tube 80 at the other open end where the other transmissive grating 70b will be placed. The cylindrical end 64 has uncured adhesive and sits inside (or onto) the tube 80 so the end 64 can be pulled in and out and rotated about the tube's center axis for alignment purposes. After active alignment, the mount 60a is secured to the tube 80 by curing the UV-cured adhesive used for the affixation and for sealing if desired.

During separate assembly steps, the second transmissive grating 70b is attached to the second mount 60b for the first end plug 40b (Block). The grating 70a can be indexed to the window 66 of the mount 60a to provide passive alignment of the datums within proper tolerances. The grating 70a is secured by curing a UV-cured adhesive.

The resulting second end plug 40b having the mount 60b and the second grating 70b is then affixed to the other open end the tube 80 (Block). During this step, the second grating 70b is actively aligned to the first grating 70a. The alignment involves placing the second grating 70b at a proper distance in the Y-axis from the first grating 70 and placing the second grating 70b parallel to the first grating 70a so the second grating 70b can combine the diffracted beams 16 to the combined beam 18. The active alignment involves placing the second transmissive grating at the proper distance along the y-axis and aligning the second datums 72b at the proper roll (r), pitch (q), and yaw (f) to the first datums 72a so the second grating 70b is parallel to the first grating 70a. The second end plug 40b is secured to the end of the tube 80 by curing the UV-cured adhesive.

Once assembled, the optical assembly 20 can be incorporated into other components of a system. For example, the fibers 32 can be spliced to laser sources 12, and the output end of the assembly 20 at the angled end 62 of the second mount 60b can be incorporated into other components of a system to provide a combined beam 18 during operation.

As noted, existing SBC optical systems must be built and serviced in a cleanroom environment by capable engineers with special tools. There is a strong desire to develop modular components that can be serviced in the field by trained technicians without being exposed to standard atmospheres, i.e., to become a modular replaceable component. For the modularity of SBC systems and components, the disclosed optical assembly 20 can be a field serviceable component that can be replaced in the field. In essence, the optical assembly 20 is an integrated unit that can be removed and replaced so that a replacement optical assembly 20 can be incorporated into other components of a system in the field. For example, the pigtail fibers 32 on the end caps 34 of the fiber array 30 can be spliced to fibers of fiber-based laser sources 12.

As noted herein, components of the optical assembly 20 are preferably made of the same material as one another, such as fused silica (quartz) or similar material. The quartz material has a low thermal expansion material (CTE <1 ppm/k). The resulting CTE matching between all of the components on the assembly 20 can help maintain the optical alignment during temperature variations when the assembly 20 is used. Advantageously, the quartz material has a high stiffness to maintain alignment during mechanical stresses. The quartz material is transparent to the desired wavelengths, which can help pass any scattered light away from optical components.

The optical assembly 20 comprises a monolithic, all silica, CTE matched optical assembly that can maintain optical alignment over wide temperature swings. The critical grating surfaces 72a-b are protected from the environment, while allowing pressure to equalize. The whole optical assembly 20 can be replaced from the fiber laser sources 12 by splicing the pigtails 32 to the fiber outputs of laser sources 12, thus providing a modular replaceable assembly.

The optical alignment for the diffracted beams 16 to the second transmissive grating 70b is performed actively in a clean environment. The alignment can be maintained during shipping, installation, and operation. Because the optical assembly 20 is pre-aligned, it can be installed by a trained technician in an exposed atmosphere.

The tube 80 and other components are transparent to the wavelength of the beams being combined so any scattered light passes through the tube 80 and can be absorbed on an outer housing wall, away from the optical components, thus mitigating some temperature variations from self-heating during operation.

Figure 7:
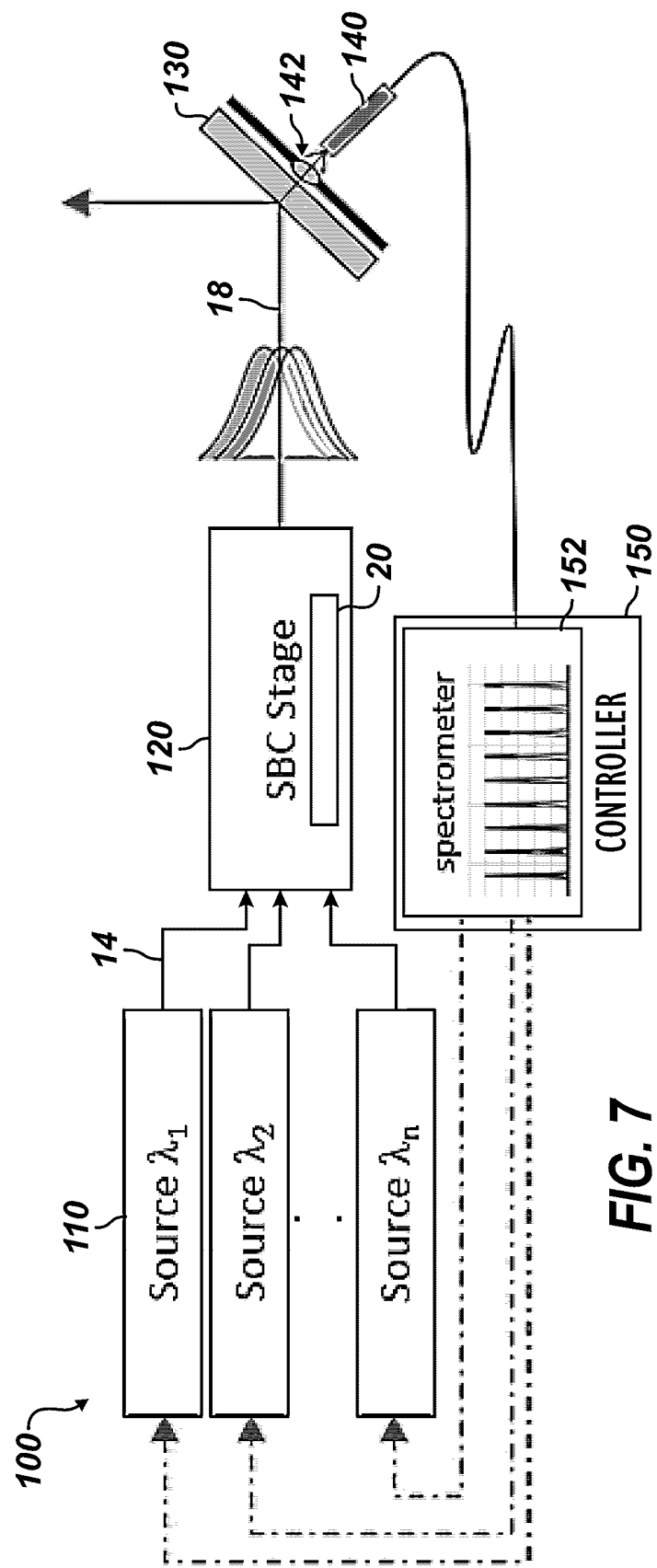
FIG. 7 illustrates an apparatus having an optical assembly and additional components according to the present disclosure.

FIG. 7 illustrates an apparatus 100 having an optical assembly 120 and additional components according to the present disclosure. The apparatus 100 includes tunable laser sources 110, a spectral beam combining stage 120, a beam detector or profiler 140, and a controller 150. The spectral beam combining stage 120 can include an optical assembly 20 as disclosed herein.

The beam detector 140 can be placed behind a turning mirror 130 to monitor the combined beam 18 output from the spectral beam combining stage 120. Based on the monitoring of the combined beam 18, the controller 150 can determine what tuning of the tunable lasers 110 is required to improve the spectral combining of the laser light. The wavelengths of the given tunable lasers 110 can be tuned, adjusted, or dithered so that the collimated beams 14 incident to the gratings (70a-b) in the optical assembly 20 produces a more spectrally combined beam 18 at the output of the spectral beam combining stage 120 or on a target in the far-field after appropriate beam direction. To monitor and analyze the combined beam 18, the controller 150 can use a spectrometer 152.

Figures 8A, 8B:
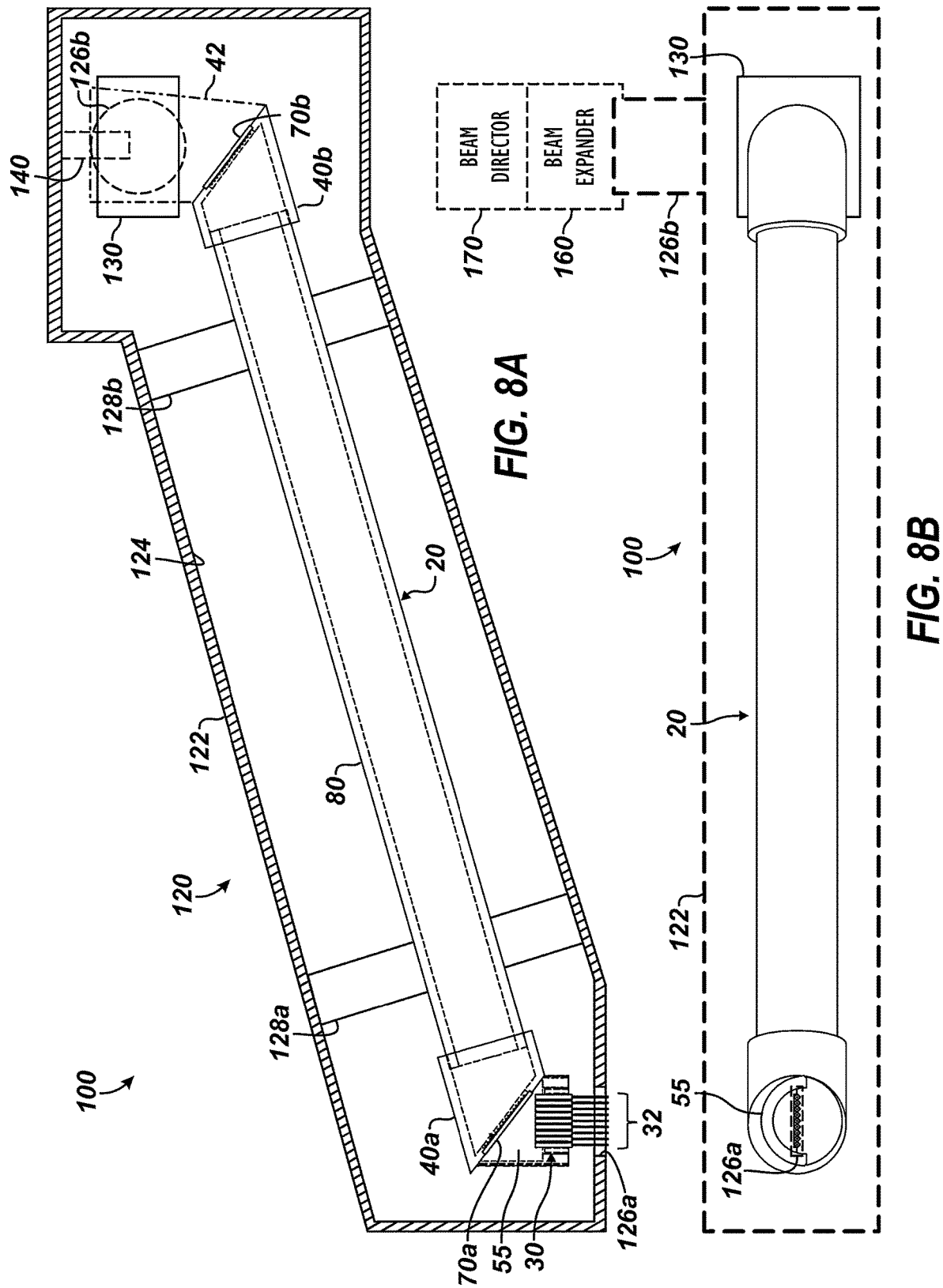
FIG. 8A schematically illustrates a plan view of an apparatus having an optical assembly and additional components according to the present disclosure.
FIG. 8B schematically illustrates a side view of the apparatus in FIG. 8A.

FIG. 8A schematically illustrates a plan view of a portion of an apparatus 100 having a spectral beam combining stage 120 and additional components according to the present disclosure. FIG. 8B schematically illustrates a side view of a portion of the apparatus 100 in FIG. 8A.

The spectral beam combining stage 120 includes the disclosed optical assembly 20, the turning mirror 130, the beam detector 140, as noted above. These components 20, 130, 140 are disposed in an exterior enclosure 122. The exterior enclosure 122 can be composed of metal and can be cooled to dissipate heat from the optical assembly 20 held inside. For example, the enclosure 122 may include channels (not shown) for liquid cooling of the enclosure. Vibration mounts 108a-b and other conventional structures can be used to affix the optical assembly 20 in the exterior enclosure 122.

Fibers 32 of the fiber assembly 30 pass through an inlet 126a in the enclosure 122. This can be sealed to prevent contaminants from entering the interior 124. The shell 55 on the first end plug 40a can protect the collimated beams from the fiber array 30 as they impinge on the first transmissive grating 70a. At the output end of the optical assembly 20, a beam tube 42 or other enclosure can enclose the free-space of the combined beam (18) as the beam (18) leaves the second grating 70b and passes to the turning mirror 130 and other optical components. For further isolation from contaminants, the mounts 128a-b or other features can seal areas in the interior 124 of the enclosure 122.

During operation, a beam expander 160 on the outlet 126b expands the combined beam, and a beam director 170 directs and focuses the beam for transmission in the environment to a target, which may be kilometers downrange. Some loss, such as 5% or so, can occur at the first grating 70a. Because the optical assembly 20 is composed of fused silica that is transparent to the subject wavelengths, any scattered light will pass out of the optical assembly 20 to the surrounding enclosure 122 and will not directly heat the optical assembly 20. Cooling can then be handled by the enclosure 122 external to the optical assembly 20.

As shown, the colinear beam 18 is typically expanded (i.e., by the beam expander 160 of FIG. 8B) before eventually entering the beam director 170, which directs and focuses the beam to a far-field target at range. In the beam director 170, the beam can be further expanded again to about 100 mm or so in diameter depending on the implementation. The expanded beam is then focused by the beam director 170 on a target at range in the far-field. For example, the far-field target can be focused to a diameter of about 10 mm depending on the implementation.

At the far-field target, which can be several kilometers downrange from the beam director 170, the default focus may be blurred due to any slight misalignment of the colinear light that makes up the combined beam. To adjust for this, the wavelengths of the colinear light that make up the combined beam can be dithered slightly. For example, the wavelength of each channel can be dithered by the controller 150 in FIG. 7 actively controlling the tunable sources 110. The wavelength differential of the dithering can be the same or the different for each channel. In addition, each channel's wavelength can be dithered with the same frequency, or each channel can be dithered at a different frequency from other channels. Overall, the differential of the dithering and the frequency at which a source's wavelength is dithered can depend on the implementation, the wavelengths involved, and other variables.

With the dithering, the focus at the far-field target can undergo periodic spikes of high alignment of the colinear light. This in turn can create intense pulses of focus over any blurred default focus. In other words, dithering the wavelengths of the channels that make up the colinear beam can superimpose periodically high intense peaks of output power over nominal power at target.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An apparatus for spectral beam combining laser wavelengths into a combined beam, the apparatus comprising:
   a cylindrical housing comprising a material transparent to the laser wavelengths, the housing having a longitudinal axis, first and second ends, and having a sealed interior;
   a first transmissive grating disposed on the first end and having first datums in the sealed interior;
   a second transmissive grating disposed on the second end and having second datums in the sealed interior, the second datums aligned to the first datums of the first transmissive grating;
   a plurality of grooves disposed in a plane on the first end and disposed at an angle relative to the first transmissive grating;
   a fiber array having fiber ends affixed in the grooves, the fiber ends aligned to the first datums of the first transmissive grating and being configured to transmit the laser wavelengths in an array of transmitted beams toward the first transmissive grating, the first datums of the first transmissive grating being configured to transmit the laser wavelengths in an array of diffracted beams through the housing to the second transmissive grating, the second datums of the second transmissive grating being configured to transmit the laser wavelengths as the combined beam from the second end of the housing;
   a first plug disposed on the first end and having a first angled face angled with respect to the longitudinal axis and a cylindrical other end opposite the first angled face and mated with the cylindrical housing, the first angled face having a first window and having the first transmissive grating affixed in the first window; and,
   a second plug disposed on the second end and having a second angled face angled with respect to the longitudinal axis and a cylindrical other end opposite the second angled face and mated with the cylindrical housing, the second angled face having a second window and having the second transmissive grating affixed in the second window.

2. The apparatus of claim 1, wherein the material comprises fused silica.

3. The apparatus of claim 2, wherein the first and second transmissive gratings comprise fused silica.

4. The apparatus of claim 1, wherein the first plug, the second plug, and the cylindrical housing each comprises the material; and wherein the material comprises fused silica.

5. The apparatus of claim 1, wherein the first plug comprises:
   a first mount having the first angled face; and
   a shelf extending from the first angled face and having the grooves.

6. The apparatus of claim 5, wherein the shelf comprises a third angled face affixed to the first angled face of the first mount and comprises a side having a block affixed thereto, the block defining the plurality of grooves.

7. The apparatus of claim 6, wherein the grooves comprise V-grooves defined in the block.

8. The apparatus of claim 1, comprising ultraviolet-cured adhesive affixing the first open end to the first end and affixing the second open end to the second end.

9. The apparatus of claim 1, wherein at least one of the first and second end plugs defines an orifice communicating the interior of the housing outside the at least one end plug, the orifice comprising a permeable structure configured to equalize pressure in the interior and to keep contaminants and moisture from the interior.

10. The apparatus of claim 1, wherein the housing defines an orifice communicating the interior of the housing outside the housing, the orifice comprising a permeable structure configured equalize pressure in the interior and to keep contaminants and moisture from the interior.

11. The apparatus of claim 1, wherein the housing defines an orifice communicating the interior of the housing outside of the housing, the orifice comprising an impermeable membrane separating the interior from outside of the housing, the impermeable membrane being configured to flex in response to a pressure differential.

12. The apparatus of claim 1, wherein the fiber ends of the fiber array comprise end caps, the fiber array being configured to splice to fibers of laser sources.

13. The apparatus of claim 1, further comprising laser sources configured to emit the laser wavelengths and optically coupled to the end caps with fibers.

14. The apparatus of claim 13, wherein the laser sources are tunable to provide the laser wavelengths; and wherein the apparatus further comprises:
   a detector configured to detect the combined beam; and
   a controller disposed in communication with the detector and the laser sources, the controller being configured to determine a characteristic of the spectral combining of the combined beam and being configured to adjust the tunable laser wavelengths of one or more of the laser sources based on the determined characteristic.

15. The apparatus of claim 14, further comprising a turning mirror disposed in optical communication with the combined beam, the turning mirror being configured to reflect a first portion of the combined beam and being configured to pass a second portion of the combined beam, the detector being configured to detect the second portion passed by the turning mirror.

16. The apparatus of claim 13, wherein the laser sources are tunable to provide the laser wavelengths; and wherein the apparatus further comprises a controller disposed in communication with the laser sources, the controller being configured to dither the laser wavelengths of the tunable laser sources.

17. The apparatus of claim 16, wherein the controller is configured to dither the laser wavelengths for each of the tunable laser sources at a same or a different wavelength differential and/or at a same or a different frequency.

18. The apparatus of claim 16, wherein in response to the dither, the controller is configured to superimpose periodically high intense peaks of output power over nominal power at target.

19. The apparatus of claim 1, further comprising an enclosure enclosing the housing in a plenum, the enclosure being cooled.

20. An apparatus for spectral beam combining laser wavelengths into a combined beam, the apparatus comprising:
   a first plug having a first angled face and a first end;
   a second plug having a second angled face and a second end;

a cylindrical housing having a first open end affixed to the first end of the first plug and having a second open end affixed to the second end of the second plug, the cylindrical housing having longitudinal axis, the first angled face and the second angled face being angled with respect to the longitudinal axis, and the first end of the first plug and the second end of the second plug each being cylindrical and size to mate with the cylindrical housing;

a first transmissive grating affixed to the first angled face of the first plug and having first datums;

a second transmissive grating affixed to the second angled face of the second plug and having second datums, the second datums aligned to the first datums of the first transmissive grating;

a plurality of grooves disposed in a plane on the first plug and disposed at an angle relative to the first transmissive grating; and end caps affixed in the grooves and aligned to the first datums of the first transmissive grating, the end caps being configured to transmit the laser wavelengths in an array of transmitted beams toward the first transmissive grating, the first datums of the first transmissive grating being configured to transmit the laser wavelengths in an array of diffracted beams through the housing to the second transmissive grating, the second datums of the second transmissive grating being configured to transmit the laser wavelengths as the combined beam.

21. A spectral beam combining system, the system comprising:

a plurality of laser sources being configured to generate the laser wavelengths; and the apparatus of claim 1, wherein the plurality of lasers are optically connected to the apparatus through the fiber array.

22. The system of claim 21, wherein the housing, first and second transmissive gratings, and the fiber array form an integrated unit, the system further comprising an enclosure, the integrated unit being replaceable in the enclosure.

* * * * *